(12) United States Patent
Itai

(10) Patent No.: US 10,353,644 B2
(45) Date of Patent: Jul. 16, 2019

(54) PRINT CONTROL APPARATUS, PRINT CONTROL METHOD, AND IMAGE FORMING SYSTEM

(71) Applicant: Oki Data Corporation, Tokyo (JP)

(72) Inventor: Tomohiro Itai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/011,676

(22) Filed: Jun. 19, 2018

(65) Prior Publication Data

US 2019/0004745 A1    Jan. 3, 2019

(30) Foreign Application Priority Data

Jun. 30, 2017   (JP) ................................ 2017-128867

(51) Int. Cl.
*G06F 3/12* (2006.01)

(52) U.S. Cl.
CPC .......... *G06F 3/1204* (2013.01); *G06F 3/1205* (2013.01); *G06F 3/125* (2013.01); *G06F 3/1208* (2013.01); *G06F 3/1256* (2013.01)

(58) Field of Classification Search
USPC ...................................................... 358/1.14
See application file for complete search history.

(56) References Cited

U.S. PATENT DOCUMENTS

| | | | | |
|---|---|---|---|---|
| 6,847,466 B1 * | 1/2005 | Gazdik | ................. | G06F 3/1205 358/1.13 |
| 2001/0055123 A1 * | 12/2001 | Ryan | ..................... | G06Q 10/06 358/1.12 |
| 2005/0186010 A1 * | 8/2005 | Shibata | ................. | B26D 7/015 400/621 |

FOREIGN PATENT DOCUMENTS

| | | |
|---|---|---|
| JP | 2009-157806 A | 7/2009 |
| JP | 2013-159103 A | 8/2013 |

* cited by examiner

*Primary Examiner* — Neil R McLean
*Assistant Examiner* — Darryl V Dottin
(74) *Attorney, Agent, or Firm* — Metrolexis Law Group, PLLC

(57) ABSTRACT

A print control apparatus includes: a print controller that controls operation of an image forming apparatus which prints images on a continuous sheet; a display controller that causes a display apparatus to display a main screen which is a print setting screen including setting items corresponding to contents of the operation of the image forming apparatus; and an input controller that receives instructions related to setting contents of the setting items. The main screen includes a first print pattern diagram. The first print pattern diagram includes: a sheet diagram part that represents a figure corresponding to pages in the continuous sheet; and setting diagram parts that represent figures corresponding to the setting contents of the setting items. The display controller updates contents of the first print pattern diagram in response to the setting contents of the setting items that the input controller receives.

8 Claims, 13 Drawing Sheets

FIG. 5A → [⊿]  LANDSCAPE ROTATION MODE

FIG. 5B  [⊿] → [4]  PORTRAIT ROTATION MODE

FIG. 5C → [ᔭ]  180° ROTATION MODE

FIG. 5D → [Ϥ]  MIRROR INVERSION
                 ↑
                 23b

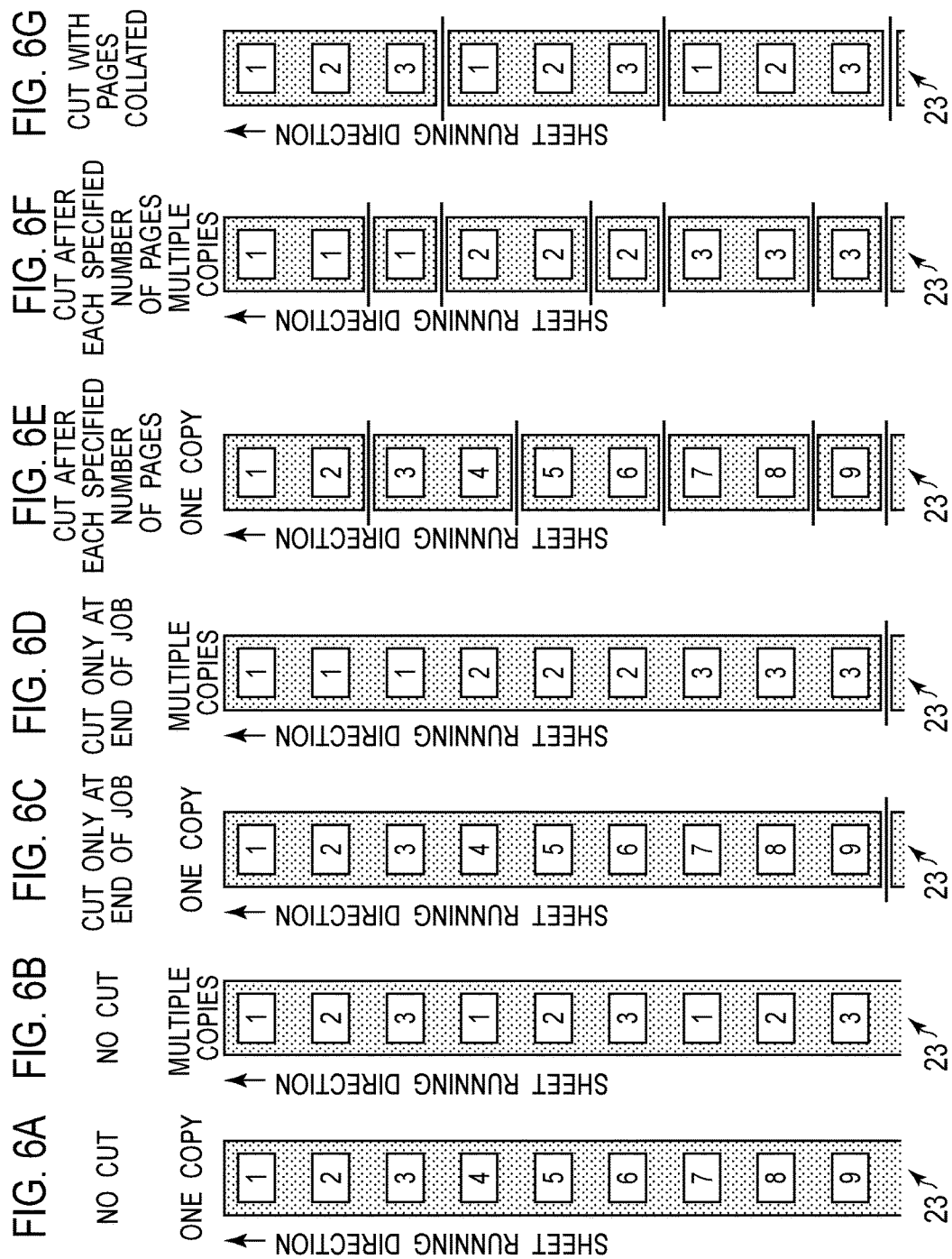

ONE COPY

MULTIPLE COPIES

COLLATION OFF

COLLATION ON

WHEN REVERSE
ORDER PRINT
IS SPECIFIED

ONE COPY

WHEN REVERSE
ORDER PRINT
IS SPECIFIED

MULTIPLE COPIES

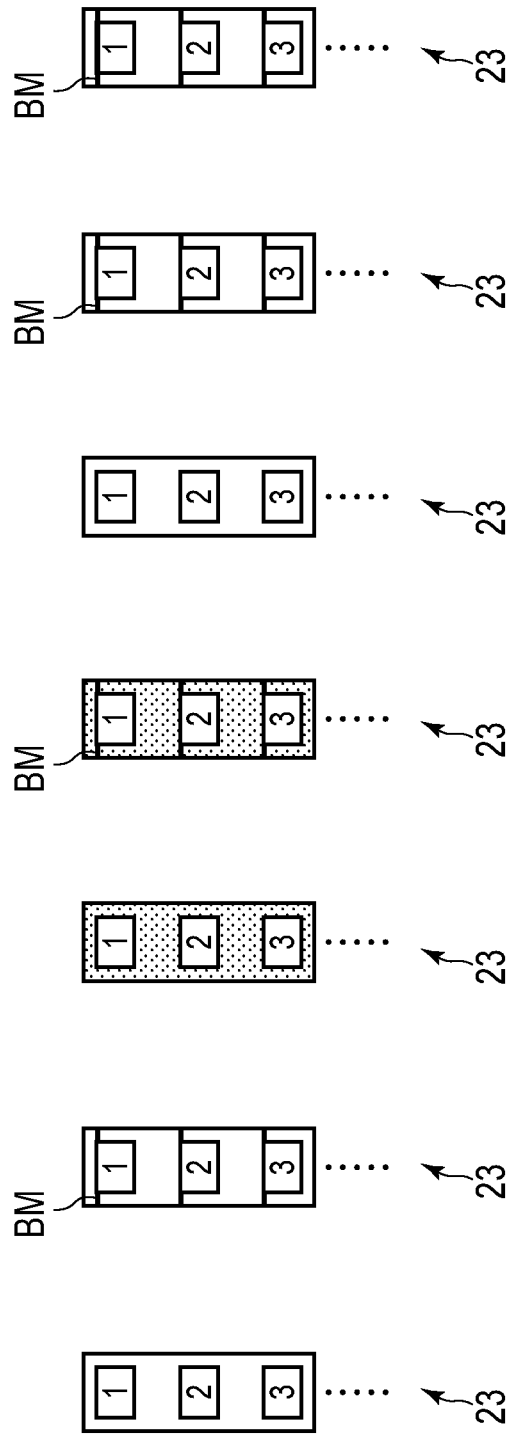

WHEN COLOR PRINTING IS SPECIFIED

WHEN MONOCHROME PRINTING IS SPECIFIED

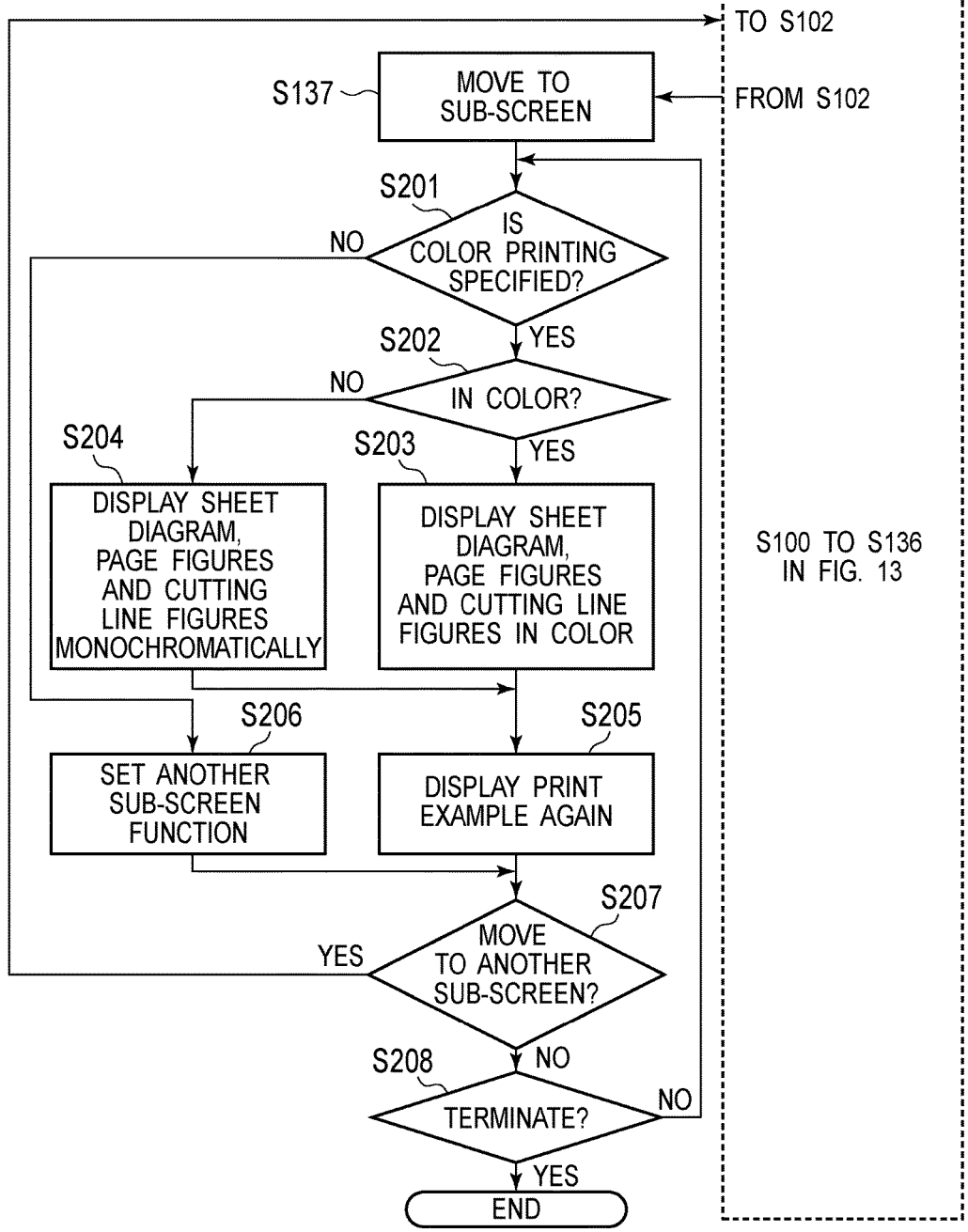

PRINT CONTROL APPARATUS, PRINT CONTROL METHOD, AND IMAGE FORMING SYSTEM

CROSS REFERENCE TO RELATED APPLICATIONS

This application claims priority based on 35 USC 119 from prior Japanese Patent Application No. JP2017-128867 filed on Jun. 30, 2017, entitled "PRINT CONTROL APPARATUS, PRINT CONTROL METHOD, PRINT CONTROL PROGRAM, AND IMAGE FORMING SYSTEM", the entire contents of which are incorporated herein by reference.

BACKGROUND

The present disclosure related to a print control apparatus, a print control method and a print control program that control operation of an image forming apparatus, as well as an image forming system that includes the image forming apparatus and the print control apparatus.

A print control apparatus, such as a personal computer, is used to control operation of a printing apparatus that is an image forming apparatus. The print apparatus activates software called a printer driver, and causes a display apparatus such as a display to display a print setting screen including various setting items. While looking at the print setting screen, the user performs setting manipulation to specify setting contents of the setting items using input apparatuses, such as a mouse and a keyboard, which are connected to the print control apparatus.

Print control methods have been proposed which display diagrams visually representing specified setting contents.

Among print control methods for printing apparatuses that print images on cut sheets is a print control method that causes a display apparatus to display a figure which represents a cut sheet, and which displays a letter facing in a direction matching a setting content of the print orientation.

Meanwhile, print control methods proposed by Japanese Patent Application Publications Nos. 2009-157806 and 2013-159103 each cause a display apparatus to display figures representing places where to cut a continuous sheet, in a print setting screen displayed on the display apparatus.

SUMMARY

The above print control methods, however, require print setting screens to be switched one after another for the purpose of setting print setting items. In addition, the above print control methods each reflect (display) only one setting item on the figure displayed on the display apparatus. To put it specifically, the print control method to be employed for the cut sheet reflects only the print orientation on the figure, and the print control method to be employed for the continuous sheet displays only the places where to cut the continuous sheet with the cutter on the figure. The print control methods accordingly force the users to check the setting items by switching the print setting screens when the users perform print settings. The print control methods, therefore, involve problems that: printing is likely to be carried out with no correction made to wrong print settings; and print settings put heavy load on the users.

In particular, the above problems are more likely to occur in print settings for the continuous sheet than in print settings for the cut sheet because the number of print setting items is lager for the continuous sheet than for the cut sheet.

An object of an embodiment is to provide a print control apparatus, a print control method and a print control program that make print setting manipulations for a continuous sheet easy and reduce print setting errors, as well as an image forming system that includes an image forming apparatus and the print control apparatus.

A first aspect is a print control apparatus that includes: a print controller that controls operation of an image forming apparatus which prints images on a continuous sheet; a display controller that causes a display apparatus to display a main screen which is a print setting screen including setting items corresponding to contents of the operation of the image forming apparatus; and an input controller that receives instructions related to setting contents of the setting items. The main screen includes a first print pattern diagram. The first print pattern diagram includes: a sheet diagram part that represents a figure corresponding to pages in the continuous sheet; and setting diagram parts that represent figures corresponding to the setting contents of the setting items. The display controller updates contents of the first print pattern diagram in response to the setting contents of the setting items that the input controller receives.

A second aspect is an image forming system that includes: an image forming apparatus that prints images on a continuous sheet; and a print control apparatus that controls operation of the image forming apparatus. The print control apparatus includes: a print controller that controls the operation of an image forming apparatus; a display controller that causes a display apparatus to display a main screen that is a print setting screen including setting items corresponding to contents of the operation of the image forming apparatus; and an input controller that receives instructions related to setting contents of the setting items. The main screen includes a first print pattern diagram. The first print pattern diagram includes: a sheet diagram part that represents a figure corresponding to pages in the continuous sheet; and setting diagram parts that represent figures corresponding to the setting contents of the setting items. The display controller updates contents of the first print pattern diagram in response to the setting contents of the setting items that the input controller receives.

According to at least one of the above aspects, the user can perform print settings for the continuous sheet using the main screen, and all the contents of the print settings can be displayed on the first print pattern diagram in a way that the contents can be visually checked. These make it possible to make the print setting manipulations for the continuous sheet easy and to reduce print setting errors.

BRIEF DESCRIPTION OF DRAWINGS

FIGS. 5A to 5D are diagrams illustrating examples of how a page figure, a setting diagram part in the print pattern diagram, changes when an orientation of images to be printed on the continuous sheet is set;

FIGS. 6A to 6G illustrate examples of how the print pattern diagram displays places where to cut the continuous sheet in accordance with specifications made using to a setting item "Cutting Mode" in the main screen;

FIGS. 10A to 10G illustrate examples of how the print pattern diagram reflects what is set in a setting item "Sheet Form" in the main screen;

FIG. 15 is a flowchart illustrating how the print control apparatus according to a second embodiment works.

DETAILED DESCRIPTION OF EMBODIMENTS

Figure 1:
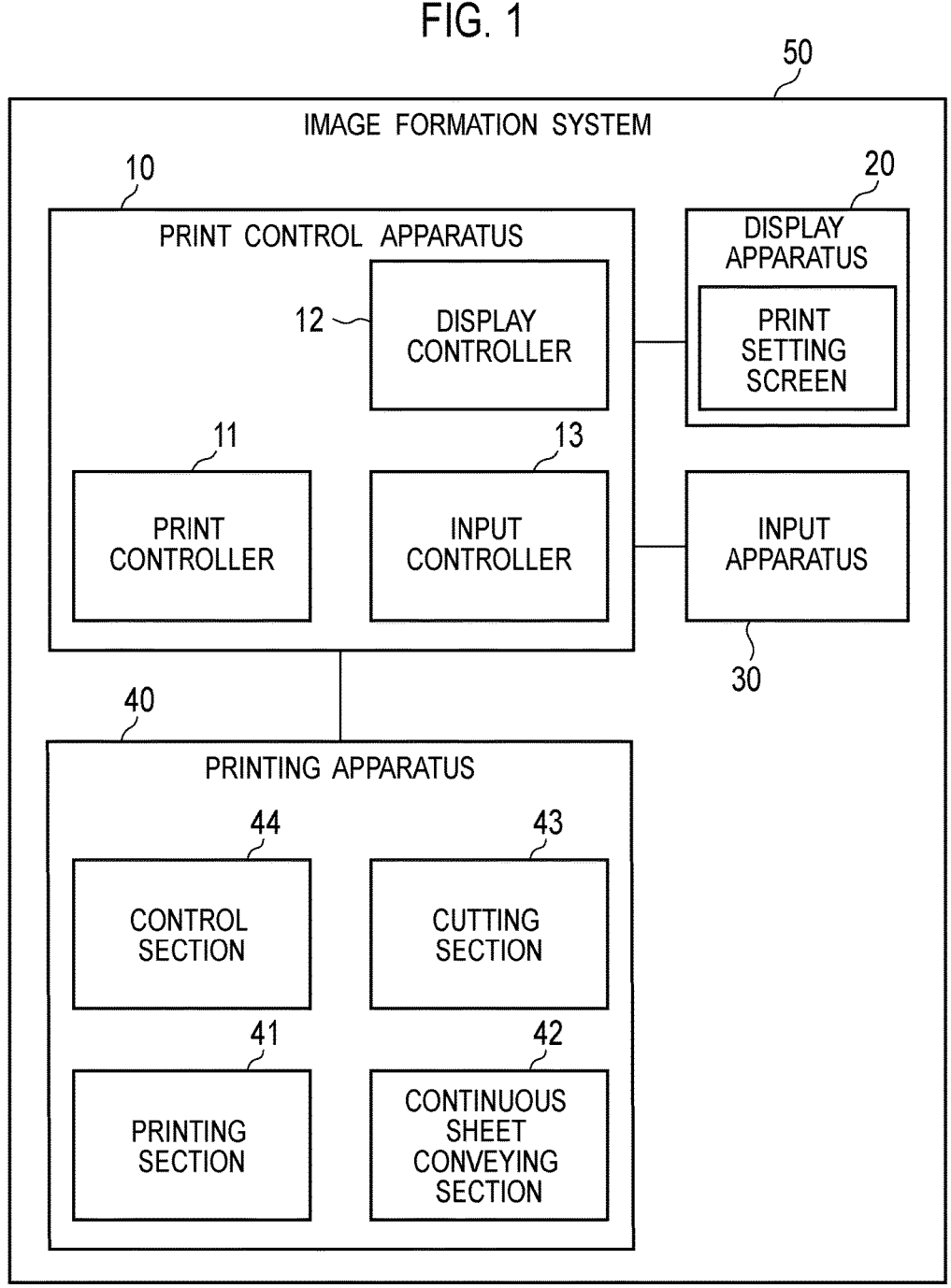
FIG. 1 is a block diagram schematically illustrating a configuration of an image forming system (including a print control apparatus) according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

1 First Embodiment

<<1-1>> Configuration

FIG. 1 is a block diagram schematically illustrating a configuration of an image forming system 50 including a print control apparatus 10 capable of performing a print control method according to a first embodiment. Furthermore, the print control apparatus 10 is the apparatus, for example a computer, which is capable of executing a printer driver that is a print control program according to a first embodiment.

As illustrated in FIG. 1, the image forming system 50 includes: a printing apparatus 40 that is an image forming apparatus; and the print control apparatus 10 that controls operation of the printing apparatus 40. The image forming system 50 further includes: a display apparatus 20 that is a display device, such as a liquid crystal monitor, which is capable of displaying a print setting screen; and input apparatuses 30, such as a mouse and a keyboard, which are manipulation input devices. The display apparatus 20 and the input apparatuses 30 may be parts of the print control apparatus 10. The display apparatus 20 and the input apparatuses 30 may be integrated into a single touch panel.

As illustrated in FIG. 1, the printing apparatus 40 includes: a printing section 41 that is a printer which prints an image on a continuous sheet; a continuous sheet conveying section 42 that is a medium conveyance mechanism which conveys the continuous sheet in a longitudinal direction of the continuous sheet (in a predetermined conveyance direction); a cutting section 43 that is a cutting mechanism which cuts the continuous sheet in a width direction of the continuous sheet (in a direction substantially orthogonal to the conveyance direction); and a control section 44 that is a controller which controls operations of the respective sections in the printing apparatus 40. The printing apparatus 40 is an apparatus that includes a function of forming (or printing) an image on the continuous sheet, and is, for example, a color printer, a monochrome printer, a facsimile machine, or a multifunctional peripheral (MFP). The continuous sheet is, for example, a sheet which has been wrapped around itself so that it forms the shape of a roll, and which is drawn out from the sheet roll that is rotationally supported. Otherwise, the continuous sheet is a sheet which is folded back and forth upon itself many times, and which is drawn out from a sheet feeder that contains the folded sheet. A printing method employed for the printing section 41 in the printing apparatus 40 is, for example, an electrophotographic printing method, or an inkjet printing method. The printing method employed for the printing section 41 may be a different printing method.

As illustrated in FIG. 1, the print control apparatus 10 includes: a print controller 11 that controls the operation of the printing apparatus 40; a display controller 12 that causes the display apparatus 20 to display a main screen 21 (see FIG. 2, for example, which is discussed later) which is the print setting screen including setting items corresponding to contents of the operation of the printing apparatus 40; and an input controller 13 that receives user manipulation information inputted from the input apparatuses 30, that is to say, instructions associated with the contents set for the setting items. In addition, the display controller 12 may include a function of being able to cause the display apparatus 20 to display a sub-screen 22 (see FIG. 3, for example, which is discussed later) that is another print setting screen including setting items corresponding to contents of the operation of the printing apparatus 40.

The print controller 11, the display controller 12 and the input controller 13 can be implemented using: a memory as a storage device that stores the printer driver which is the print control program; and a processor as an information processing device that executes the print control program stored in the memory. Otherwise, parts of the print controller 11, the display controller 12 and the input controller 13 may be implemented using a semiconductor integrated circuit, and the rests of the print controller 11, the display controller 12 and the input controller 13 may be implemented using: a memory as a storage device that stores a print control program; and a processor that executes the print control program stored in the memory.

Figure 2:
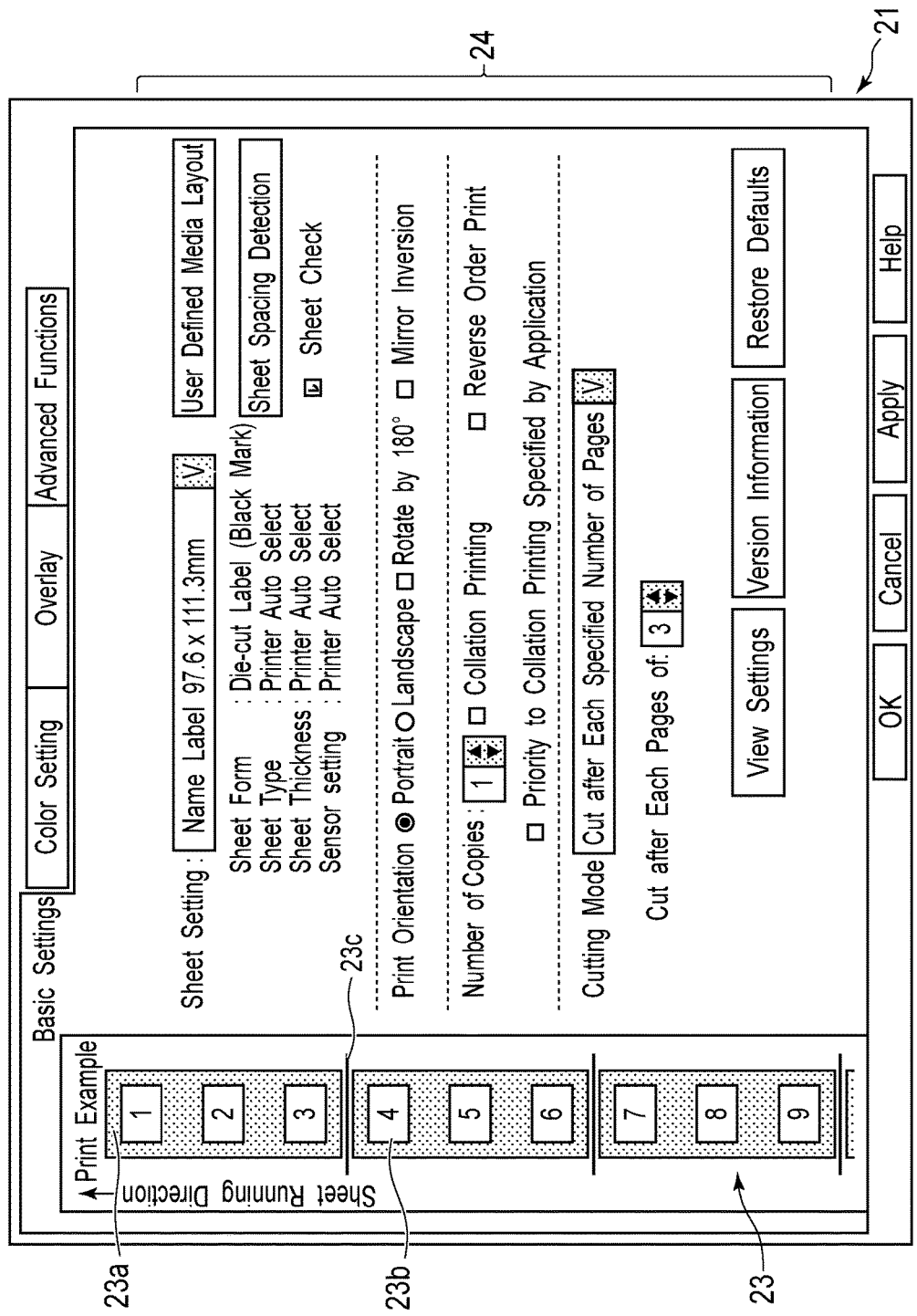
FIG. 2 is a diagram illustrating an example of a main screen (including a print pattern diagram) that is a print setting screen which the print control apparatus causes a display apparatus to display.

FIG. 2 is a diagram illustrating an example of the main screen 21 (including a print pattern diagram 23) that is the print setting screen which the print control apparatus 10 causes the display apparatus 20 to display.

The main screen 21 is the print setting screen that the printer driver causes the display apparatus 20 to display at first when the print control apparatus 10 activates the printer driver. The main screen 21 includes setting items (basic setting items) 24 essential for printing. The main screen 21 further includes a print pattern diagram (print sample) 23 that includes a figure corresponding to a print result from the printing apparatus 40. The print pattern diagram 23 includes: a sheet diagram part 23a that represent a figure corresponding to pages (9 pages in the example illustrated in FIG. 2) in the continuous sheet; and setting diagram parts (page diagram parts 23b and cutting line diagram parts 23c in the example illustrated in FIG. 2) that represent figures corresponding to setting contents of the setting items.

The setting items on the main screen 21 illustrated in FIG. 2 include at least two of "Print Orientation," "Number of Copies" and "Cutting Mode." "Print Orientation" is a first item that sets the orientation of images to be printed on the continuous sheet. "Number of Copies" is a second item that sets the number of copies of images to be printed on the continuous sheet, and the order in which the images are printed on the continuous sheet. "Cutting Mode" is a third item that sets places where to cut the continuous sheet. In the example illustrated in FIG. 2, the main screen 21 includes the first to third items as the setting items. Incidentally, basic setting items (that is to say, setting items to be reflected on the print pattern diagram 23) to be set using the main screen 21 are not limited to the three items illustrated in FIG. 2. For example, the main screen 21 may further include and display setting items for color printing and monochrome printing, which a second embodiment describes as setting items on a sub-screen, in the basic settings.

"Print Orientation" is a setting item that specifies the orientation of images to be printed on the continuous sheet.

"Number of Copies" may include: a setting item that specifies how many copies need to printed for one print job; a setting item that specifies whether to collate pages to be printed; and a setting item that specifies forward order printing or reverse order printing. In the forward order print, the print is performed in ascending order of page numbers. In the reverse order printing, the print is performed in descending order of page numbers.

"Cutting Mode" is a setting item that specifies places where to cut the continuous sheet, for example, how many pages precedes each time the continuous sheet is cut.

Figure 3:
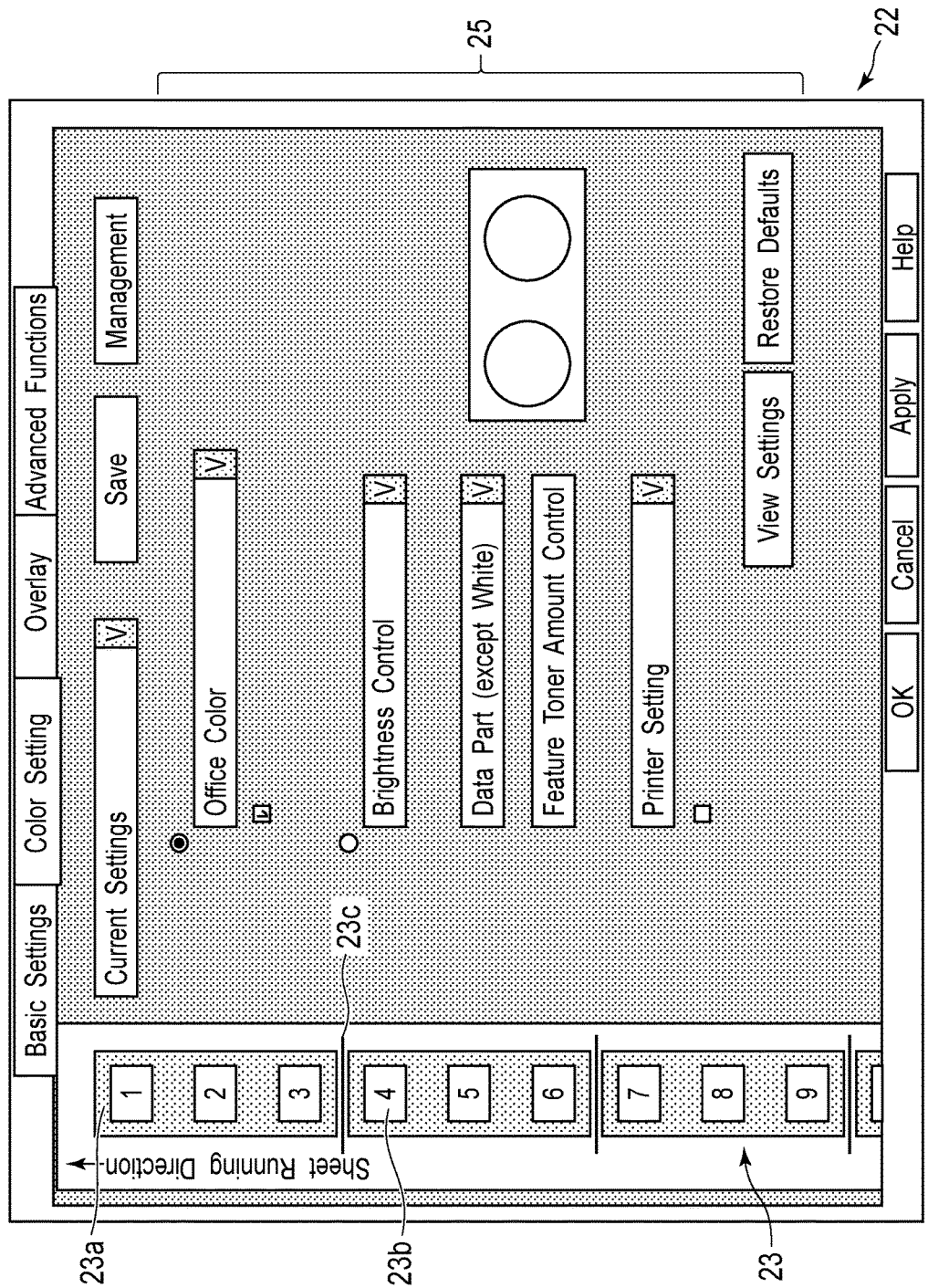
FIG. 3 is a diagram illustrating an example of a sub-screen (including the print pattern diagram) that is another print setting screen which the print control apparatus causes the display apparatus to display.

FIG. 3 is a diagram illustrating an example of the sub-screen 22 (including the print pattern diagram 23) that is another print setting screen which the print control apparatus 10 causes the display apparatus 20 to display.

The sub-screen 22 is the print setting screen that the printer driver causes the display apparatus 20 to display based on the user's manipulation. The sub-screen 22 includes setting items 25 for printing. In the example illustrated in FIG. 3, the setting items 25 on the sub-screen 22 are those that specify a setting content of a choice between color printing and monochrome printing. The sub-screen 22 further includes the print pattern diagram 23 that includes a figure corresponding to a print result from the printing apparatus 40. It is desirable that the print pattern diagram 23 on the sub-screen 22 be identical to the print pattern diagram 23 on the main screen 21. Incidentally, in a case where it is necessary to differentiate between the print pattern diagram 23 on the main screen 21 and the print pattern diagram 23 on the sub-screen 22, the print pattern diagram 23 on the main screen 21 is referred to as a "first print pattern diagram" whereas the print pattern diagram 23 on the sub-screen 22 is referred to as a "second print pattern diagram." It is desirable that the first print pattern diagram and the second print pattern diagram be completely identical to each other. As long as, however, the setting items discernable from the first print pattern diagram and the setting items discernable from the second print pattern diagram are the same as each other, slight differences in display size, display place and the like are tolerable between the first print pattern diagram and the second print pattern diagram. In other words, it is required that the first print pattern diagram and the second print pattern diagram include the same figures for the setting items on the main screen 21.

Figure 4:
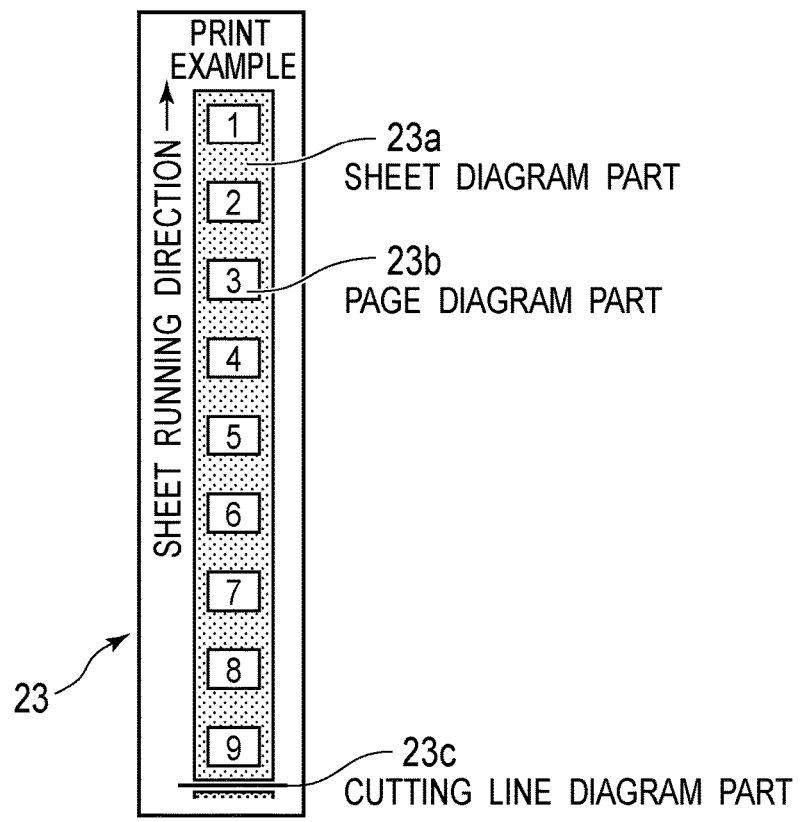
FIG. 4 is a diagram illustrating an example of the print pattern diagram that includes a sheet diagram part representing a figure corresponding to pages in a continuous sheet, and setting diagram parts representing figures corresponding to setting contents of setting items.

FIG. 4 is a diagram illustrating an example of the print pattern diagram 23 that includes: the sheet diagram part 23a which represents a figure corresponding to pages (9 pages in the example illustrated in FIG. 4) in the continuous sheet; and setting diagram parts that represent figures corresponding to the setting contents of the setting items. In FIG. 4, an upward arrow represents a sheet running direction. In the example illustrated in FIG. 4, the setting diagram parts include the page diagram parts 23b, and the cutting line diagram parts 23c. The page diagram parts 23b each correspond to a printed area on the continuous sheet. Numbers "1" to "9" in the respective page diagram parts 23b change their orientations in response to a setting content of a print orientation. The cutting line diagram parts 23c represent places where to cut the continuous sheet. The example in FIG. 4 illustrates a case where 9 pages precede each time the continuous sheet is cut.

FIGS. 5A to 5D are diagrams illustrating examples of how a page diagram part 23b in the print pattern diagram 23 changes when an orientation of the images to be printed on the continuous sheet is set. FIG. 5A illustrates an example of how the page diagram part 23b is displayed when "Landscape" is specified in a setting item "Print Orientation" depicted in FIG. 2 (when the page diagram part 23b rotates to the right by) 90°. FIG. 5B illustrates an example of how the page diagram part 23b is displayed when "Portrait" is specified in the setting item "Print Orientation" depicted in FIG. 2 (when the page diagram part 23b rotates to the left by 90°. FIG. 5C illustrates an example of how the page diagram part 23b is displayed when "Rotate by 180°" is specified in the setting item "Print Orientation" depicted in FIG. 2. FIG. 5D illustrates an example of how the page diagram part 23b is displayed when "Mirror Inversion" is specified in the setting item "Print Orientation" depicted in FIG. 2.

FIGS. 6A to 6G illustrate examples of how the print pattern diagram 23 displays places where to cut the continuous sheet in accordance with specifications made using another setting item "Cutting Mode" in the main screen 21. FIG. 6A illustrates an example of how the print pattern diagram 23 is displayed in a case where: the continuous sheet is not cut; and the number of copies is one. FIG. 6B illustrates an example of how the print pattern diagram 23 is displayed in a case where: the continuous sheet is not cut; and the number of copies is two or more. FIG. 6C illustrates an example of how the print pattern diagram 23 is displayed in a case where: the continuous sheet is cut at the end of a print job; and the number of copies is one. FIG. 6D illustrates an example of how the print pattern diagram 23 is displayed in a case where: the continuous sheet is cut at the end of a print job; and the number of copies is two or more. FIG. 6E illustrates an example of how the print pattern diagram 23 is displayed in a case where: the continuous sheet is cut at the end of each specified number of pages (each two pages); and the number of copies is one. FIG. 6F illustrates an example of how the print pattern diagram 23 is displayed in a case where: the continuous sheet is cut at the end of each specified number of pages (each two pages); and the number of copies is two or more. FIG. 6G illustrates an example of how the print pattern diagram 23 is displayed in a case where the continuous sheet is cut with pages collated.

Figure 7A:
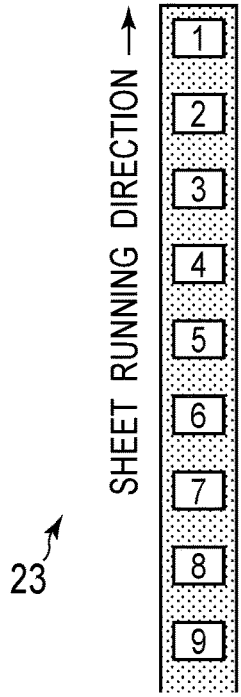
FIGS. 7A and 7B illustrate examples of how the print pattern diagram reflects what is set in a setting item "Number of Copies" in the main screen.
Figure 7B:
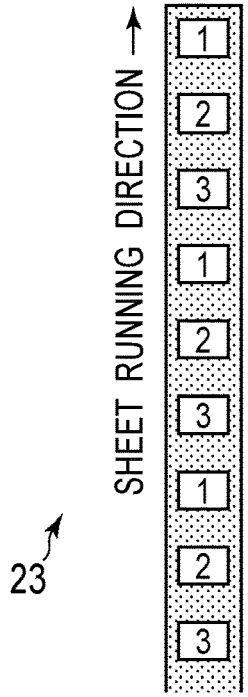

FIGS. 7A and 7B illustrate examples of how the print pattern diagram 23 reflects what is set in a setting item "Number of Copies" in the main screen 21. FIG. 7A illustrates an example of how the print pattern diagram 23 is displayed in a case where: the continuous sheet is not cut; printing is performed with pages collated; and the number of copies is one. FIG. 7B illustrates an example of how the print pattern diagram 23 is displayed in a case where: the continuous sheet is not cut; printing is performed with pages collated; and the number of copies is two or more.

Figure 8A:
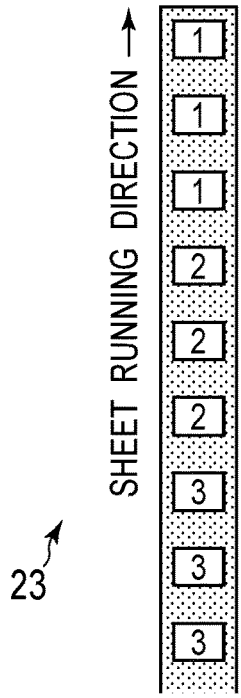
FIGS. 8A and 8B illustrate examples of how the print pattern diagram reflects what is set in a setting item "Collate" in the main screen.
Figure 8B:
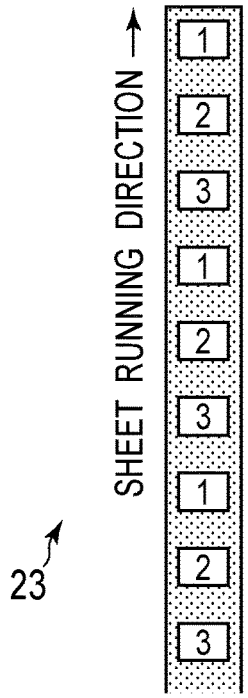

FIGS. 8A and 8B illustrate examples of how the print pattern diagram 23 reflects what is set in a setting item "Collate" in the main screen 21. FIG. 8A illustrates an example of how the print pattern diagram 23 is displayed in a case where: the continuous sheet is not cut; and printing is performed with no pages collated (a case where "Collate" is off). FIG. 8B illustrates an example of how the print pattern diagram 23 is displayed in a case where: the continuous sheet is not cut; and printing is performed with pages collated (a case where "Collate" is on).

Figure 9A:
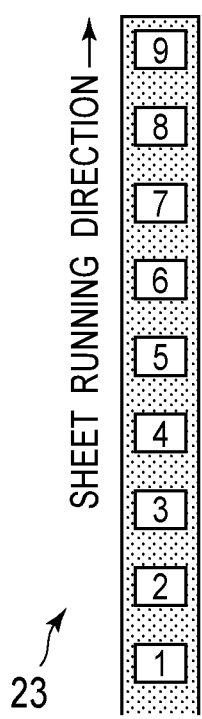
FIGS. 9A and 9B illustrate examples of how the print pattern diagram reflects forward order print and reverse order print that are specified in another setting item in the main screen.
Figure 9B:
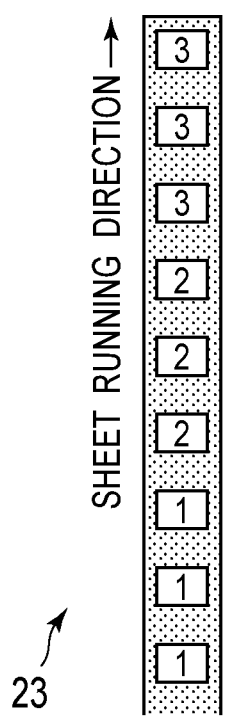

FIGS. 9A and 9B illustrate examples of how the print pattern diagram 23 reflects forward order printing and reverse order printing that are set in another setting item in the main screen 21. FIG. 9A illustrates an example of how the print pattern diagram 23 is displayed in a case where: the continuous sheet is not cut; "Reverse Order Print" is on; and the number of copies is one. FIG. 9B illustrates an example of how the print pattern diagram 23 is displayed in a case where: the continuous sheet is not cut; "Reverse Order Print" is on; and the number of copies is two or more.

FIGS. 10A to 10G illustrate example of how the sheet diagram part in the print pattern diagram 23 reflects what is set in another setting item "Sheet Form" in the main screen 21. Although FIGS. 10A to 10G each illustrate only three pages, the actual print pattern diagram includes 9 pages. FIG. 10A illustrates an example of how the print pattern diagram 23 is displayed in a case where printing is performed on a continuous sheet that has no black mark BM serving as a position reference. FIG. 10B illustrates an example of how the print pattern diagram 23 is displayed in a case where printing is performed on a continuous sheet that has a black mark BM. FIG. 10C illustrates an example of how the print pattern diagram 23 is displayed in a case where: printing is performed on die-cut labels that are arranged with a gap between each two neighboring labels on a continuous backing sheet; and the continuous sheet has no black mark BM. FIG. 10D illustrates an example of how the print pattern diagram 23 is displayed in a case where: printing is performed on die-cut labels that are arranged with a gap between each two neighboring labels on a continuous backing sheet; and the continuous sheet has black marks BM. FIG. 10E illustrates an example of how the print pattern diagram 23 is displayed in a case where: printing is performed on a full label that includes a continuous backing sheet and a continuous label material; and the continuous sheet has no black mark BM. FIG. 10F illustrates an example of how the print pattern diagram 23 is displayed in a case where printing is performed on a full label that includes a continuous backing sheet and a continuous label material; and the continuous sheet has black marks BM. FIG. 10G illustrates an example of how the print pattern diagram 23 is displayed in a case where: printing is performed on a full label that includes a continuous backing sheet and a continuous half-cut label material; and the continuous sheet has black marks BM.

The main screen 21 illustrated in FIG. 2 may be designed such that the user can specify a continuous sheet type, as a setting content of a fourth item "Sheet Setting."

Figure 11A:
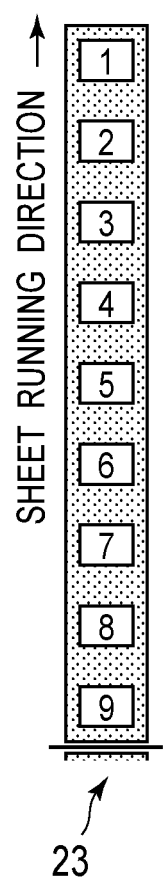
FIGS. 11A and 11B illustrate examples of how the print pattern diagram reflects a color printing specification and a monochrome printing specification that are set in a setting item in the sub-screen.
Figure 11B:
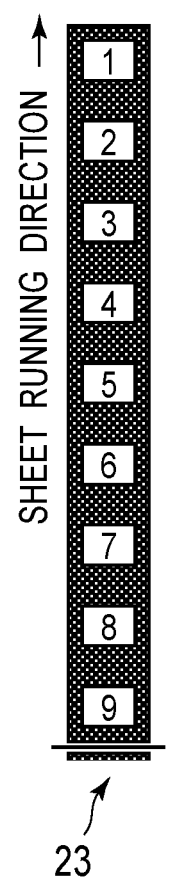

FIGS. 11A and 11B illustrate examples of how the print pattern diagram 23 reflects a color printing specification and a monochrome printing specification that are set in a setting item in the sub-screen 22 depicted in FIG. 3. FIG. 11A illustrates an example of the print pattern diagram 23 that is displayed in color in a case where color printing is specified. FIG. 11B illustrates an example of the print pattern diagram 23 that is displayed monochromatically in a case where monochrome printing is specified.

Figure 12:
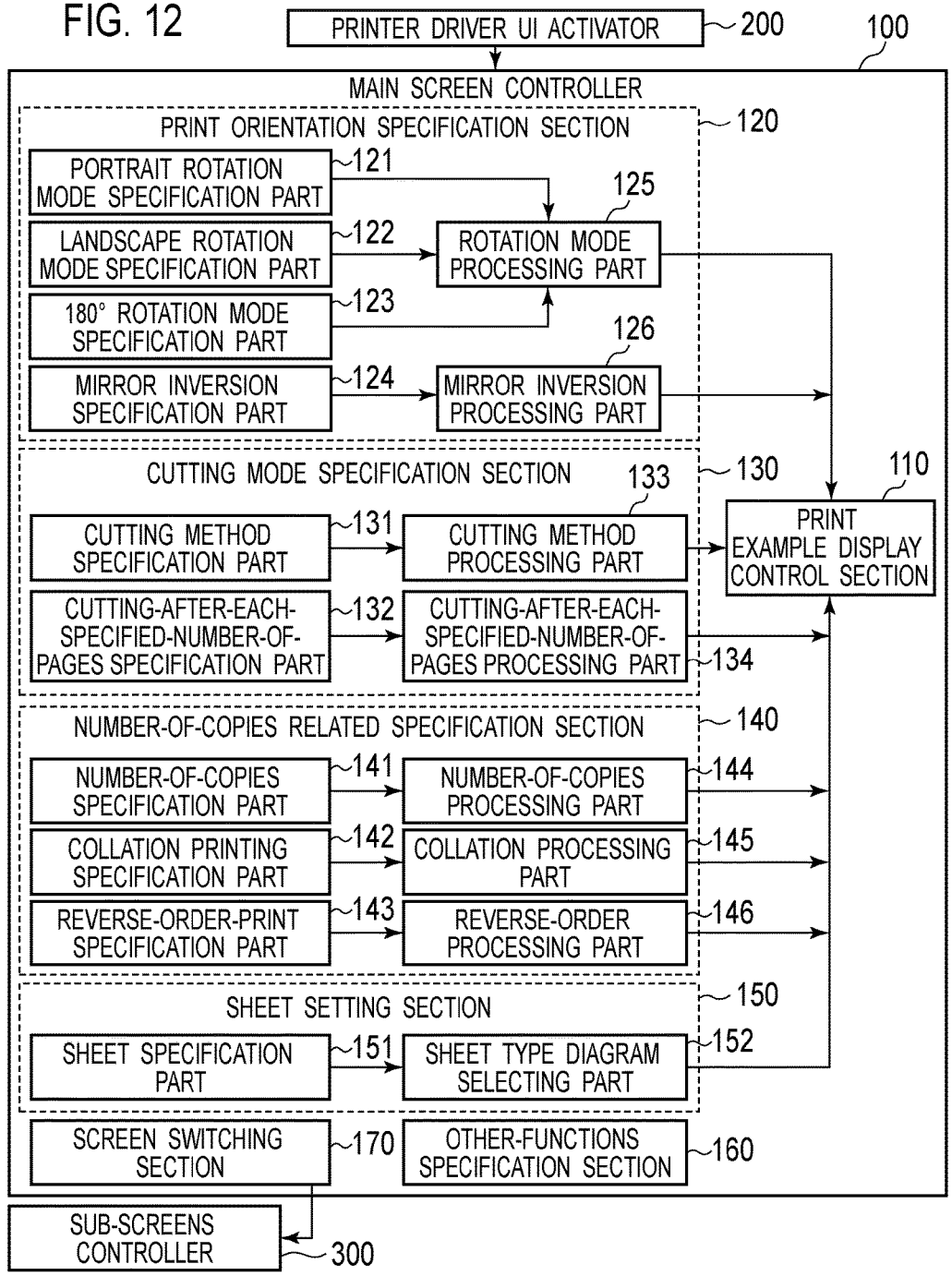
FIG. 12 is a functional block diagram schematically illustrating a configuration of the print control apparatus according to a first embodiment.

FIG. 12 is a functional block diagram illustrating the configuration of the print control apparatus 10.

The print control apparatus 10 includes a printer driver user interface (UI) activator 200. The printer driver user interface (UI) activator 200 activates a setting screen of the printer driver to display the main screen 21 (FIG. 2).

The print control apparatus 10 includes a main screen controller 100 and a sub-screens controller 300.

The main screen controller 100 includes a print example display control section 110, a print orientation specification section 120, a cutting mode specification section 130, a number-of-copies related specification section 140, a sheet setting section 150, other-functions specification section 160 and a screen switching section 170.

The print example display control section 110 obtains information about the setting contents of the setting items for the functions from the print orientation specification section 120, the cutting mode specification section 130, the number-of-copies related specification section 140 and the sheet setting section 150, as well causes the display apparatus 20 to display the print pattern diagram 23 that represents what are set. The print pattern diagram 23 includes: the sheet diagram part 23a; the page diagram parts 23b that represent how the pages in the sheet look like; and the cutting line diagram parts 23c that represent how the sheet is cut (FIG. 4). The print pattern diagram 23 is displayed not only in the main screen 21, but also one or more sub-screens 22.

The print orientation specification section 120 includes a portrait rotation mode specification part 121, a landscape rotation mode specification part 122, a 180° rotation mode specification part 123, a mirror inversion specification part 124, a rotation mode processing part 125, and a mirror inversion processing part 126.

The portrait rotation mode specification part 121 specifies a portrait rotation mode to be performed to rotate the print orientation into a vertical orientation (FIG. 5B). The landscape rotation mode specification part 122 specifies a landscape rotation mode to be performed to rotate the print orientation into a horizontal orientation (FIG. 5A). The 180° rotation mode specification part 123 specifies a 180° rotation mode to be performed to rotate the print orientation by 180° (FIG. 5C). The rotation mode processing part 125 rotates the page figure based on information from the orientation mode specification parts 121 to 123 (FIG. 5A to 5C).

The mirror inversion specification part 124 specifies a mirror inversion (FIG. 5D). The mirror inversion processing part 126 mirror-inverts the page figure based on information from the mirror inversion specification part (FIG. 5D).

The cutting mode specification section 130 includes a cutting method specification part 131, a cutting-after-each-specified-number-of-pages specification part 132, a cutting method processing part 133, and a cutting-after-each-specified-number-of-pages processing part 134.

The cutting method specification part 131 specifies what cutting method the printing apparatus 40 needs to employ. In a case where the cutting method specification part 131 specifies "Cut after Each Specified Number of Pages," the cutting-after-each-specified-number-of-pages specification part 132 specifies the number of pages. Depending on what is specified by the cutting method specification part 131, the cutting method processing part 133 inserts cutting line figures into the print pattern diagram (FIGS. 6A to 6G). Depending on what is specified by the cutting-after-each-specified-number-of-pages specification part 132, the cutting-after-each-specified-number-of-pages processing part 134 inserts cutting line figures into the print pattern diagram (FIGS. 6A to 6G).

The number-of-copies related specification section 140 includes a number-of-copies specification part 141, a collation printing specification part 142, a reverse-order-printing specification part 143, a number-of-copies processing part 144, a collation processing part 145, and a reverse-order processing part 146.

The number-of-copies specification part 141 specifies the number of copies. The collation printing specification part 142 specifies whether to print with pages collated. The reverse-order-printing specification part 143 specifies whether to print in the reverse order. The number-of-copies processing part 144 changes arrangement of the page figures depending on whether the number of printed copies is one or more (FIGS. 7A and 7B). The collation processing part 145 changes arrangement of the page figures, depending on whether the collation printing is specified (FIGS. 8A and 8B). The reverse-order processing part 146 changes arrangement of the page figures corresponding to the reverse order printing (FIGS. 9A and 9B).

The sheet setting section 150 includes a sheet specification part 151 and a sheet type diagram selecting part 152. The sheet specification part 151 receives a sheet selection from the input apparatuses 30 (FIG. 10A to 10G). The sheet type diagram selecting part 152 displays a diagram corresponding to a selected sheet, in the sheet diagram part in the print pattern diagram.

The other-functions specification section 160 specifies other functions that are unrelated to the print example. The screen switching section 170 switches the main screen (FIG. 2) to the sub-screen (FIG. 3).

The sub-screens controller 300 specifies other functions in each sub-screen.

<<1-2>> Working

Figure 13:
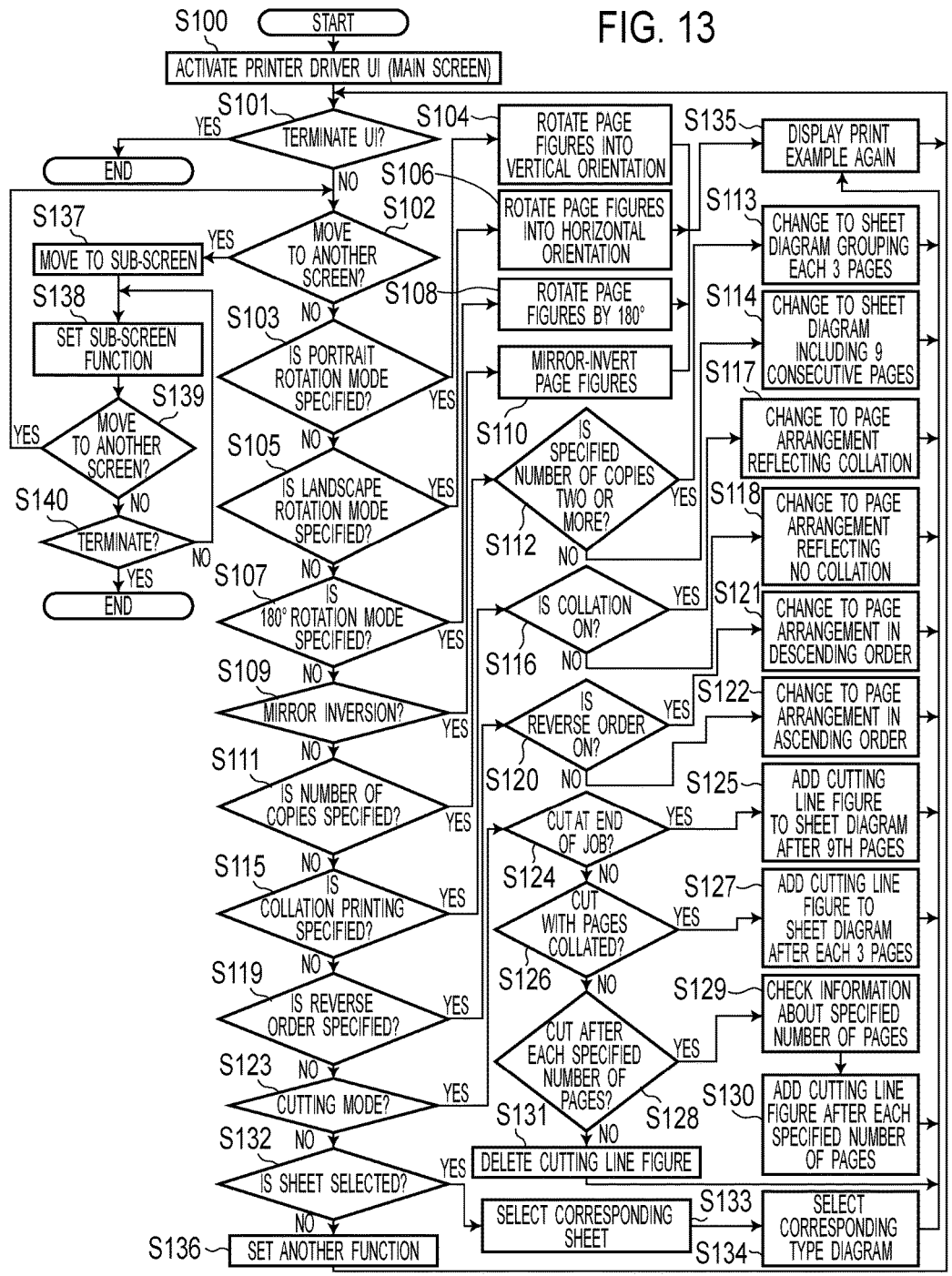
FIG. 13 is a flowchart illustrating how the print control apparatus works.

FIG. 13 is a flowchart illustrating how the print control apparatus 10 works. To begin with, the print control apparatus 10 activates the main screen user interface (UI) to change the settings of the printer driver (step S100).

Subsequently, if the print control apparatus 10 determines to end the main screen UI, the print control apparatus 10 terminates the main screen UI (step S101). If the print control apparatus 10 determines not to end the main screen UI, the print control apparatus 10 whether to move to another screen. If the user makes settings using the sub-screen, the print control apparatus 10 moves to the sub-screen (step S102).

Thereafter, the print control apparatus 10 determines whether the portrait rotation mode has been specified (step S103). If the portrait rotation mode has been specified, the print control apparatus 10 rotates the page figures to the left by 90° (step S104).

Then, the print control apparatus 10 determines whether the landscape rotation mode has been specified (step S105).

If the landscape rotation mode has been specified, the print control apparatus 10 rotates the page figures to the right by 90° (step S106).

Next, the print control apparatus 10 determines whether the 180° rotation mode has been specified (step S107). If the 180° rotation mode has been specified, the print control apparatus 10 rotates the page figures by 180° (step S108).

Subsequently, the print control apparatus 10 determines whether the mirror inversion has been specified (step S109). If the mirror inversion has been specified, the print control apparatus 10 flips the page figures horizontally (step S110).

Thereafter, the print control apparatus 10 determines whether the number of copies has been specified (step S111). If the specified number of copies is two or more (step S112), the print control apparatus 10 changes the sheet diagram in the print pattern diagram to that in which each 3 pages are grouped (step S113). If the specified number of copies is one, the print control apparatus 10 changes the sheet diagram in the print pattern diagram to that which includes 9 consecutive pages (step S114).

Then, the print control apparatus 10 determines whether the collation printing has been specified (step S115). If the collation printing has been specified (step S116), the print control apparatus 10 arranges the page figures in a "123123123" order (step S117). If the collation printing has been cancelled (step S118), the print control apparatus 10 arranges the page figures in a "111222333" order.

Next, the print control apparatus 10 determines whether the reverse order printing has been specified (step S119). If the reverse order printing has been specified (step S120), the print control apparatus 10 sets the arrangement of the page figures in a descending order (step S121). If the reverse order printing has been cancelled, the print control apparatus 10 rearranges the page figures in an ascending order (step S122).

If the cutting mode has been specified (step S123), and if the cutting only at the end of the job has been specified (step S124), the print control apparatus 10 adds the cutting line figure after the 9th page (step S125).

If the cutting mode has been specified, and if the cutting with pages collated has been specified (step S126), the print control apparatus 10 adds the cutting line figure after each 3 pages (step S127).

If the cutting mode has been specified, and if the cutting after each specified number of pages has been specified (step S128), the print control apparatus 10 checks information about the specified number of pages (step S129), and adds the cutting line figure after each specified number of pages (step S130).

If no cutting has been specified in the cutting mode specification, the print control apparatus 10 deletes the cutting line figure (step S131).

Subsequently, the print control apparatus 10 determines whether a sheet selection has been inputted (step S132). If the sheet selection has been inputted, the print control apparatus 10 selects the corresponding sheet (step S133), and displays the corresponding type diagram in the print pattern diagram (step S134).

Next, based on updated pieces of information, the print control apparatus 10 updates the print pattern diagram 23 that represents the print example (step S135).

In addition, the user specifies another function that is unrelated to the print example (step S136).

When the print control apparatus 10 moves to the sub-screen (step S137), the user sets functions using the sub-screen (step S138). If the user wishes to move to another screen (step S139), the print control apparatus 10 moves to the screen (step S139). If the user specifies the termination (step S140), the print control apparatus 10 terminates the print setting process.

<<1-3>> Effects

As discussed above, the print pattern diagram 23 included in the print setting screen reflects all the functions for the print setting. The user, therefore, can check all the print setting items at a glance of the single print pattern diagram 23, and can grasp the print result before the printing.

Furthermore, the print pattern diagram 23 represents pages (for example, 9 pages) in the continuous sheet. The user, therefore, can easily check whether "Reverse Order Print" is selected, whether "Number of Copies" is specified, and what is selected in "Cutting Mode."

Moreover, the setting items to be reflected on the print pattern diagram 23 are aggregated on the main screen. The user, therefore, can check what settings are selected, and how the settings are reflected, in real time. This makes it possible to reduce load on the user in the print setting.

In addition, the print pattern diagram 23 is displayed on all the sub-screens as well. The user, therefore, can check information about the current settings on any of the sub-screens 22 without returning to the main screen 21. This makes it possible to reduce load on the user in the print setting.

As a result of these, before the printing, the user can easily check whether the print result is desirable visibly by use of the print pattern diagram 23, and waste paper due to specification errors and the like can be reduced.

2 Second Embodiment

<<2-1>> Configuration

The first embodiment has described the main screen 21 that is capable of displaying all the setting items which have influences on the print pattern diagram 23 representing the print example. There is, however, a case where all the setting items having influences on the print example cannot be placed on the main screen. For example, if the display area of the print setting screen is limited to a narrow area, or for a reason why setting items for functions belonging to the same categories are designed to be placed in the same print setting screen (that is to say, setting items are designed to be aggregated into a single screen or divided into different screens, depending on functions), there is a case where all the basic setting items cannot be placed in the main screen that is the single print setting screen.

With this taken into consideration, a second embodiment is configured such that: setting items having influences on the print example are placed in the sub-screen 22 as well; and setting items updated using the sub-screen 22 can be checked using a print pattern diagram displayed in another screen. Descriptions are provided for a print control apparatus, for example, which causes the sub-screen 22 to include a setting item for selecting color printing or monochrome printing, and which reflects a setting content of the setting item on the print pattern diagram 23.

Figure 14:
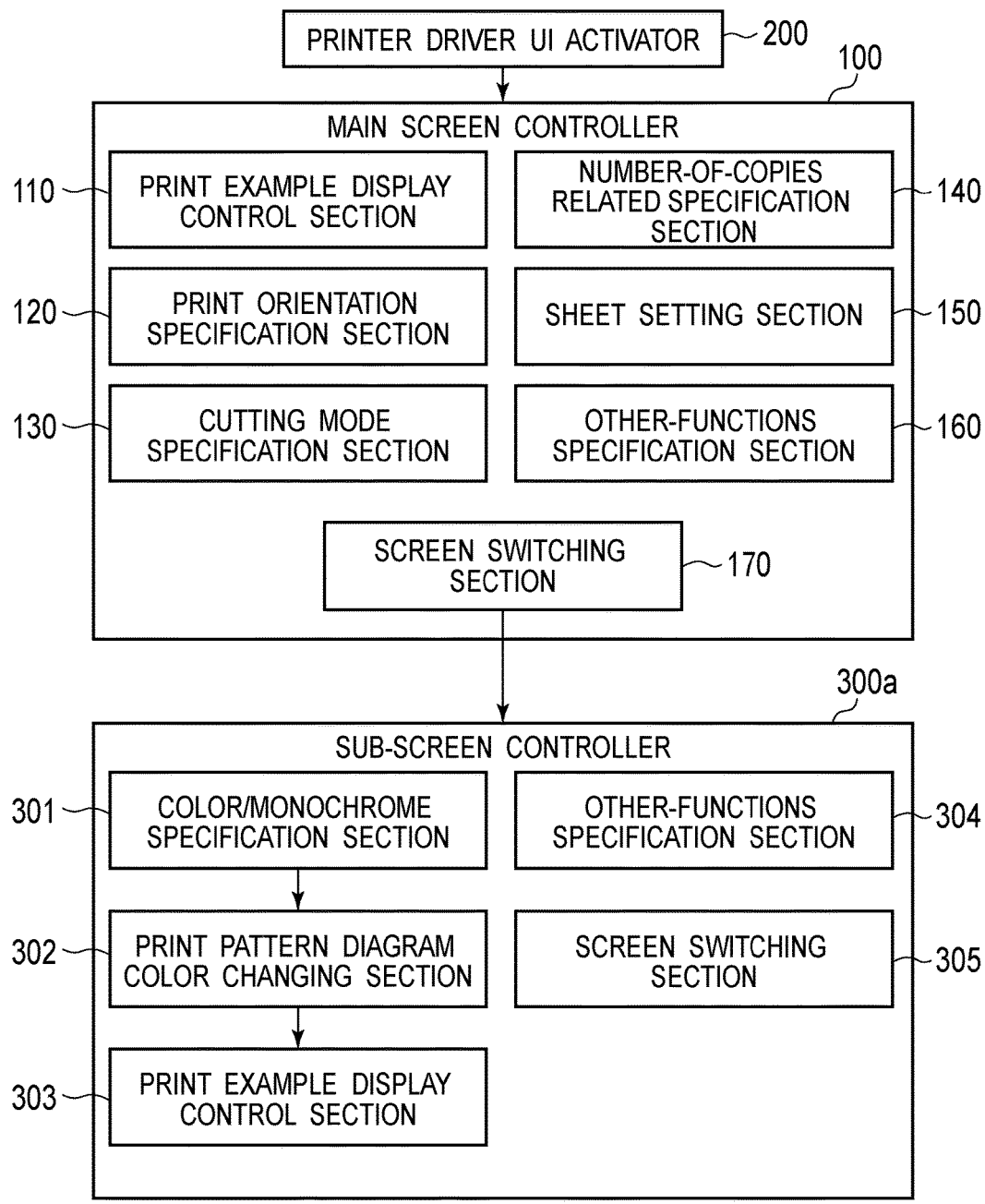
FIG. 14 is a functional block diagram schematically illustrating a configuration of a print control apparatus according to a second embodiment.

FIG. 14 is a functional block diagram schematically illustrating a configuration of the print control apparatus according to a second embodiment. In FIG. 14, components that are the same as or correspond to those illustrated in FIG. 12 are denoted by the same reference signs as those used in FIG. 12. FIG. 14 does not illustrate parts of the components inside the main screen controller 100 because FIG. 12 has illustrated them. As illustrated in FIG. 14, the print control apparatus according to a second embodiment is different from the print control apparatus according to the first embodiment in that a sub-screen controller 300a includes a color/monochrome specification section 301, a print pattern diagram color changing section 302, a print example display control section 303, an other-functions specification section 304, and a screen switching section 305.

The color/monochrome specification section 301 specifies whether to print in color or monochromatically.

The print pattern diagram color changing section 302 changes the display of the print pattern diagram 23. Depending on what the color/monochrome specification section 301 specifies, the print pattern diagram color changing section 302 displays the print pattern diagram 23 (the sheet diagram, the page figures, and the cutting line figures) in color or monochromatically (FIGS. 11A and 11B).

The print example display control section 303 causes the display apparatus 20 to display the print pattern diagram 23 that is the print example which includes the contents set in the setting items in the sub-screen 22. In other words, the print example display control section 303 updates the contents of the print pattern diagram in the sub-screen and the contents of the print pattern diagram in the main screen, depending on a setting content which is inputted in an item for setting color image printing or monochrome image printing, and which the input controller receives.

The other-functions specification section 304 specifies functions other than the item specified by the color/monochrome specification section 301 using the sub-screen 22.

The screen switching section 305 switches the display screen to another sub-screen other than the main screen 21 and the sub-screen 22.

<<2-2>> Working

FIG. 15 is a flowchart illustrating how the printer driver of the print control apparatus according to a second embodiment works. In FIG. 15, processing steps that are the same as or correspond to those illustrated in FIG. 13 are denoted by the same step numbers as those used in FIG. 13. Incidentally, steps S100 to S136 in FIG. 15 are the same as those in the first embodiment, and FIG. 15 does not illustrate these steps. The following descriptions focus on what makes the process in the second embodiment different from that in the first embodiment.

The printer driver determines whether a manipulation for specifying color printing or monochrome printing has been inputted using the sub-screen 22 (step S201). If the manipulation has been inputted, the printer driver moves the process forward to step S202.

In step S202, the printer driver checks whether the color printing or the monochrome printing has been specified. If the color printing has been specified, the printer driver moves the process forward to step S203 to display the sheet diagram, the page figures and the cutting line figures of the print pattern diagram 23 in color.

If the printer driver determines in step S202 that the monochrome printing has been specified, the printer driver moves the process forward to step S204 to display the sheet diagram, the page figures and the cutting line figures monochromatically.

The printer driver again renders the print pattern diagram 23 that is the print example (step S205).

If in step S201, a setting item other than the setting item for specifying the color printing or the monochrome printing is set, the printer driver causes the display apparatus 20 to display another sub-screen (step S206).

If in step S207, the printer driver moves to another screen (step S207), the printer driver moves the process forward to step S102. If in step S207, the printer driver moves to no other screen, the printer driver determines whether to terminate the print setting process (step S208). If the printer driver determines not to terminate the print setting process, the printer driver returns the process to step S201. If the print driver determines to terminate the print setting process, the print control apparatus terminates the print driver, and ends the print setting.

<<2-3>> Effects

As discussed above, the sub-screen 22 also has the function of updating the print pattern diagram 23, which brings about effects in which: the contents set using the sub-screen 22 can be reflected on the print pattern diagram 23; and what are set can be checked on another screen.

In other respects, the second embodiment is the same as the first embodiment.

This disclosure is applicable to the print control apparatus which is communicably connected to the printing apparatus that is the image forming apparatus, and which includes the printer driver that is the software for controlling the printing operation of the printing apparatus.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A print control apparatus comprising:
    a print controller that controls operation of an image forming apparatus which prints images on a continuous sheet, wherein the continuous sheet includes a continuous backing sheet and labels arrayed on the continuous backing sheet;
    a display controller that causes a display apparatus to display a main screen which is a print setting screen including setting items corresponding to contents of the operation of the image forming apparatus; and
    an input controller that receives an instruction related to setting contents of the setting items, wherein
    the main screen includes a first print pattern diagram,
    the first print pattern diagram comprises
        a sheet diagram part comprising a figure of the continuous sheet including pages corresponding to the labels arrayed in the continuous sheet, and
        setting diagram parts comprising figures corresponding to the setting contents of the setting items, wherein the setting diagram parts are added to the sheet diagram part, and
    the display controller updates contents of the first print pattern diagram in response to the instruction related to the setting contents of the setting items that is received by the input controller.

2. The print control apparatus according to claim 1, wherein
    the setting items on the main screen include
        a first item that specifies an orientation of the images to be printed on the continuous sheet,
        a second item that specifies the number of copies of the images to be printed on the continuous sheet, and an order in which the images are printed on the continuous sheet, and
        a third item that specifies a place where to cut the continuous sheet, and
    the display controller updates the contents of the first print pattern diagram in response to the instruction related to the setting contents of at least two of the first to third items that is received by the input controller.

3. The print control apparatus according to claim 2, wherein the setting items on the main screen include a fourth item that specifies a type of the continuous sheet.

4. The print control apparatus according to claim 1, wherein
    the display controller causes the display apparatus to display one of the main screen and a sub-screen that is another print setting screen which includes setting items corresponding to contents of the operation of the image forming apparatus,
    the sub-screen includes a second print pattern diagram,
    the first print pattern diagram and the second print pattern diagram include the same figures for the setting items on the main screen, and
    the display controller updates contents of the second print pattern diagram and the contents of the first print pattern diagram in response to the instruction related to the setting contents of the setting items which are included in the sub-screen, which the input controller receives.

5. The print control apparatus according to claim 4, wherein
    the setting items on the sub-screen include a fifth item that sets whether to print color images or monochrome images on the continuous sheet, and
    the display controller updates the contents of the second print pattern diagram and the contents of the first print pattern diagram in response to the instruction related to the setting content of the fifth item that the input controller receives.

6. The print control apparatus according to claim 5, wherein the first print pattern diagram and the second print pattern diagram include an identical color representation for the fifth item.

7. The print control apparatus according to claim 4, wherein
    the main screen is a setting screen that the display controller causes the display apparatus to display at first when the display controller is activated, and
    the sub-screen is a setting screen that the display controller causes the display apparatus to display based on an instruction inputted into the display controller.

8. A print control method of controlling operation of an image forming apparatus that prints images on a continuous sheet,
    the method comprising:
    causing a display apparatus to display a main screen that is a print setting screen including setting items corresponding to contents of the operation of the image forming apparatus; and
    receiving an instruction related to setting contents of the setting items, wherein
    the main screen includes a first print pattern diagram,
    the first print pattern diagram includes
        a sheet diagram part comprising a figure of the continuous sheet including pages arrayed in the continuous sheet, and
        setting diagram parts comprising figures corresponding to the setting contents of the setting items, wherein the setting diagram parts are added to the sheet diagram part,
    the method further comprises updating contents of the first print pattern diagram in response to the instruction related to the setting contents of the setting items, the continuous sheet includes a continuous backing sheet and labels arrayed on the continuous backing sheet, and the sheet diagram part comprises a figure of the continuous sheet including pages corresponding to the labels arrayed in the continuous sheet.

* * * * *